Oct. 4, 1966

S. M. JENKINS 3,277,353

VARIABLE CAPACITOR

Filed April 13, 1965

3,277,353
VARIABLE CAPACITOR
Stuart M. Jenkins, Fareham, England, assignor to Plessey-UK Limited, Ilford, England, a British company
Filed Apr. 13, 1965, Ser. No. 447,823
Claims priority, application Great Britain, Apr. 15, 1964, 15,516/64
6 Claims. (Cl. 317—249)

This invention relates to improvements in capacitors.

According to one aspect of the invention we provide a variable capacitor comprising at least one pair of electrodes, each electrode comprising a sheet of conductive material, mounted parallel to each other, in spaced apart relationship by a dielectric, so as to be rotatable one relative to the other, and at least one further conductive member spaced from a portion of the peripheries of the electrodes, the further member being electrically connected to one of the electrodes and being movable towards or away from the other electrode, whereby the tuning law of the variable capacitor can be varied.

The further member(s) may conveniently be electrically connected or formed integrally with a stationary electrode(s) or stator(s) of the capacitor and be movable relative to the other rotatable electrode(s) or rotor(s).

The further member(s) may be in the form of a strip extending around the peripheries of the electrodes and may be formed with slots arranged so as to form a number of electrically interconnected elements each separately movable relative to said other electrode by bending.

The dielectric may be in the form of a dielectric ceramic material and one of the electrodes may be formed as a metallised coating on a portion of one face thereof.

Further aspects and features of the invention will become apparent from the following description of a preferred embodiment thereof, with reference to the drawing accompanying the specification in which.

Figure 1:
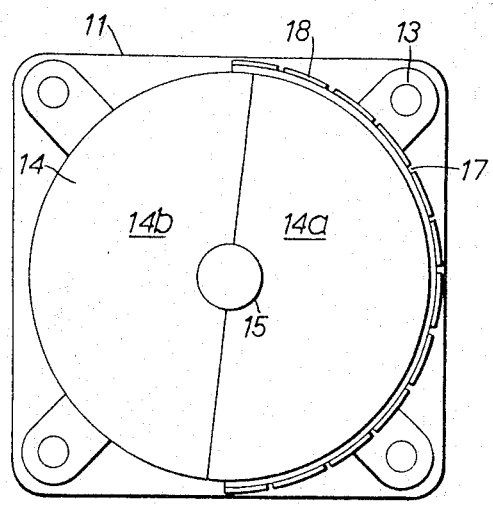
FIGURE 1 shows a plan view of a variable capacitor.
Figure 2:
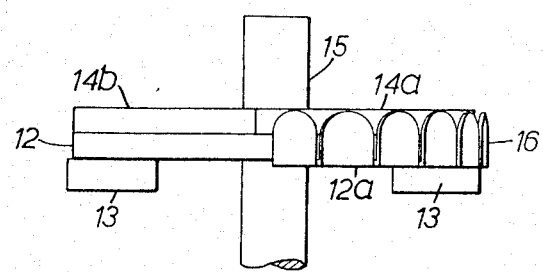
FIG. 2 shows a side elevational view of part of the capacitor of FIGURE 1.

Referring now to the drawing there is shown a support body 11 to which is rigidly fixed a stator 12 by means of stator support members 13. The stator 12 comprises a circular disc of ceramic dielectric material having a metallised layer 12a formed on a portion of one face thereof.

The free face of the stator 12 coacts with a rotor 14 comprising an insulating portion 14b and a metal portion 14a, for example of stainless steel. The rotor 14 is mounted for rotation relative to stator 12 by means of spindle 15.

A strip of conductive material 16 is also mounted on the stator support members 13 and positioned so as to extend around half the peripheries of the stator 12 and rotor 14. The conductive member 16 is formed with slots 17 so as to provide a number of elemental segments 18. The conductive member 16 is electrically connected to the metallised layer 12a of stator 12 and is such that the elemental segments 18 can be bent towards or away from the rotor 14.

The capacitance of the capacitor can therefore be adjusted by bending required ones of the elemental segments 18 nearer or further away from the rotor thus respectively increasing or decreasing the capacitance at various angular degrees of rotation. Hence there is provided adjustment for the tuning law of the capacitor or the provision for matching a number of variable capacitors.

Although the embodiment shown discloses a ceramic dielectric type capacitor it should be appreciated that the present invention can be utilised with other types of variable capacitors for example ones with air dielectric.

What I claim is:

1. A variable capacitor comprising at least one pair of main electrodes each of which comprises a sheet of electrically conductive material, said main electrodes being mounted parallel to each other in spaced apart relationship by a dielectric so as to be rotatable one relative to the other, and at least one further conductive member electrically connected to one of the said main electrodes and including a conductive strip extending around the peripheries of the electrodes but spaced away therefrom, and said strip having at least one slot defined therein to provide a plurality of electrically interconnected auxiliary capacitor electrodes each of said auxiliary electrodes being separately movable relative to said main electrodes by bending.

2. A variable capacitor as defined in claim 1 wherein said pair of electrodes comprises a stationary electrode and a movable electrode rotatable relative to said stationary electrode.

3. A variable capacitor as defined in claim 2 wherein said further conductive member is electrically connected to said stationary electrode.

4. A variable capacitor as defined in claim 3 wherein said further conductive member is formed integrally with said stationary electrode.

5. A variable capacitor as defined in claim 1 wherein said dielectric is of dielectric ceramic material.

6. A variable capacitor as defined in claim 5 wherein one of said electrodes is formed as a metallized coating on one face of said dielectric.

References Cited by the Examiner
UNITED STATES PATENTS

| | | | |
|---|---|---|---|
| 2,535,367 | 12/1950 | Minnium | 317—249 |
| 3,015,766 | 1/1962 | Repko | 317—253 |
| 3,131,338 | 4/1964 | Howell | 317—249 |

LEWIS H. MYERS, *Primary Examiner.*
ROBERT K. SCHAEFER, *Examiner.*
E. GOLDBERG, *Assistant Examiner.*